United States Patent [19]
Anderson et al.

[11] Patent Number: 5,905,713
[45] Date of Patent: *May 18, 1999

[54] METHOD AND APPARATUS FOR ANALYZING DIGITAL MULTI-PROGRAM TRANSMISSION PACKET STREAMS

[75] Inventors: Paul R. Anderson, Hermosa Beach; Irving Rabowsky, Woodland Hills, both of Calif.

[73] Assignee: Hughes Electronics Corporation, El Segundo, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/632,239

[22] Filed: Apr. 15, 1996

[51] Int. Cl.[6] .................................................... H04N 7/173
[52] U.S. Cl. ........................... 370/241; 370/394; 348/906
[58] Field of Search .................................... 370/241, 394, 370/389, 474, 476, 477, 522, 242; 348/1, 7, 12, 13, 461, 906, 845.1; 455/3.1, 3.2, 4.1, 4.2, 6.1; 364/514 R

[56] References Cited

U.S. PATENT DOCUMENTS

| | | | |
|---|---|---|---|
| 5,231,494 | 7/1993 | Wachob | 455/6.1 |
| 5,410,344 | 4/1995 | Graves et al. | 348/1 |
| 5,459,789 | 10/1995 | Tamer et al. | 380/20 |
| 5,473,609 | 12/1995 | Chaney | 370/312 |
| 5,475,688 | 12/1995 | Bridgewater et al. | 370/394 |
| 5,576,755 | 11/1996 | Davis et al. | 348/906 |
| 5,598,415 | 1/1997 | Nuber et al. | 370/522 |

FOREIGN PATENT DOCUMENTS

| | | |
|---|---|---|
| 0 679 030 A2 | 4/1995 | European Pat. Off. . |
| WO 94/10775 | 11/1993 | WIPO . |

*Primary Examiner*—Chau Nguyen
*Attorney, Agent, or Firm*—John A. Crook; Michael W. Sales

[57] ABSTRACT

A method and device for monitoring a multi-program data stream. The data stream preferably contains digital packets multiplexed from different data and control channels. A service information channel or program guide is available from the data stream to identify the various channels and the associated packets in the data stream. The packet stream analyzer verifies the program guide and the contents of the program guide against the packets found in the packet stream. The semantics and sequencing of packets can also be verified. Verification errors can be recorded and displayed via an interface computer.

22 Claims, 4 Drawing Sheets

METHOD AND APPARATUS FOR ANALYZING DIGITAL MULTI-PROGRAM TRANSMISSION PACKET STREAMS

BACKGROUND OF THE INVENTION

The present invention relates in general to the monitoring of digital multi-program transmissions. More particularly, it relates to monitoring multiplexed packet data streams consisting of digitally encoded video, audio, and data.

Advances in video and audio compression technology, integrated circuit technology, and the communications infrastructure have resulted in a new multiplexed broadcast format for efficient delivery of high quality video and audio programming to consumers, as well as the delivery of useful data services. In particular, the advent of high power communication satellites in combination with the multiplexed broadcast format have allowed over 100 channels of digital video to be transmitted directly to a viewer's home.

For example, digital video information in a multiplexed broadcast format may be transmitted in identifiable groups of bytes or packets. The digital video byte stream is chopped up and packaged into fixed-length packets. The packets from several different video sources can be rapidly assembled together (i.e., multiplexed) onto a single carrier frequency. All packets from a single source form a program or service channel. A single carrier frequency can thus receive and transmit a multiplexed packet stream comprising a number of different video program channels.

In a direct broadcast satellite (DBS) transmission system, for example, a typical high-power satellite transponder is capable of transmitting a single carrier signal containing four live-action television channels or up to eight recorded film channels. A modern satellite can carry dozens of transponders to provide over 100 video channels. Each transponder downlinks its multiplexed or multi-program packet stream to a receiver which resolves the multiplexed packet stream into the original video data channels for display. Similar digital multi-program transmission systems are planned for use in other networks, such as cable networks, computer networks, fiber optic networks and the like.

The broadcast and transmission of packetized data, however, requires new monitoring equipment. For example, ordinary broadcast television can typically be monitored by in-studio personnel simply viewing the live broadcast. With the number of program channels available and high bit rates utilized for digital video transmission, a more sophisticated test system is required. The multiplexed nature of the transmission format does not allow direct access to a particular channel in order to monitor the signal. In-studio monitoring of the broadcast picture of over 100 video channels would also require a large staff of personnel. Furthermore, the forward error correction (FEC) supplied with the transmitted signal corrects and hides signal errors until they reach a level serious enough to cause the received video picture to "freeze" or the complete loss of the transmitted picture. Visual monitoring of the video picture therefore provides little warning of a degrading signal condition before a catastrophic failure of picture quality.

The troubleshooting and isolation of faults in the multiplexed transmission system is also more difficult because of the complex nature of the high-speed digital architecture. The digital transmission system performs the digital conversion, compression, encryption, packetizing, multiplexing and transmission of a large number of signals from various sources at extremely high bit rates. High-speed electronic circuits are required to packetize the digital data and supply the necessary transport control information. At high bit transfer rates, timing errors between circuits may cause packets in the packet stream to be lost. The high data rates and digital nature of the packetized signal, however, makes such errors undetectable to the unassisted human eye. All of the video signals are digitally compressed, encrypted, and packetized so that the video signal cannot be viewed to assist in the troubleshooting of faults. The video picture can only be viewed after the digital signal is depacketized, unencrypted, decompressed, and displayed at the receiver.

The packetized transport architecture of the digital multiplexed transmission system also adds a layer of complexity to the system. The packetized transport architecture requires transport system control information to insure proper de-packetization of the packet stream by the receiver. Errors in the transport system control information may cause the receiver to fail to properly reconstruct the digital data stream.

Accordingly, there is a need for an instrument that can monitor and verify the integrity of the packet stream of digital signals transmitted by a digital multiplexed satellite communication system.

SUMMARY OF THE INVENTION

The present invention relates to a packet stream analyzer for digital packet data streams. The packet stream analyzer first accesses service information about the various channels carried in a multi-program packet data stream. This service information is contained in service information or "program guide" packets within the multi-program packet stream. The service information/program guide channel preferably contains the basic information needed by a receiver to identify and locate a desired service channel within the multi-program packet stream. The service information includes identification and location of all transmitted program and service channels, assignment of user channel numbers, channel names and logos, identification of individual program names, air times, descriptions, rating information and the like, system time, identification and location of other control streams, and other similar functions.

For example, a DBS television system may transmit program guide packets containing information about the different video, audio, and data channels carried by its multi-program packet data stream. The packet stream analyzer reads the header of each packet and identifies the program guide or master program guide (MPG) packets. The MPG contains information about the various channels available in the multi-program packet stream. The packet stream analyzer verifies the packets and channels listed by the MPG against the packets and channels present in the packet stream.

In another embodiment of the invention, the packet stream analyzer may also verify the integrity of the packet stream according to information in the header of each packet. For example, each packet header may contain up to three 8-bit bytes which maintain the proper sequencing of packets and identifies the contents of the packet. The packet stream analyzer uses the header information to verify the contents and sequencing of packets.

The various packets, channels, and transponders in the packet stream are displayed to provide an electronic program guide of the packet data stream. The results of the verification tests can also be displayed to enable a user to monitor the packet stream.

The preferred embodiment of the invention includes a tuner, a demodulator, inverse forward error correction logic (FEC$^{-1}$), and analyzer logic for monitoring and verifying the digital packet stream. The tuner, demodulator and FEC$^{-1}$ recover the transmitted packet data stream. The analyzer logic performs the monitoring and verification functions on the packet stream. Preferably, the analyzer logic processes packets in real-time. The analyzer logic preferably consists of a dedicated logic processor or gate array. Preferably, a user display is provided to display results and accept user input.

The packet stream analyzer thus allows a user to display and monitor the status of the multiplexed packet data stream. The packet stream analyzer performs verification tests and displays any errors. A user can detect errors in the packet stream by monitoring the status display for results which indicate a problem. The types of errors and the status provided by the packet stream analyzer provides the user insights which may lead to the identification of faults in the multiplexed broadcasting system.

It is to be understood that both the foregoing general description and the following detailed description are exemplary and explanatory and are intended to provide further explanation of the invention as claimed. The invention, together with the further objects and intended advantages, will best be understood by reference to the following detailed description, taken in conjunction with the accompanying drawings.

BRIEF DESCRIPTION OF TEE DRAWINGS

DETAILED DESCRIPTION OF THE DRAWINGS

Figure 1:
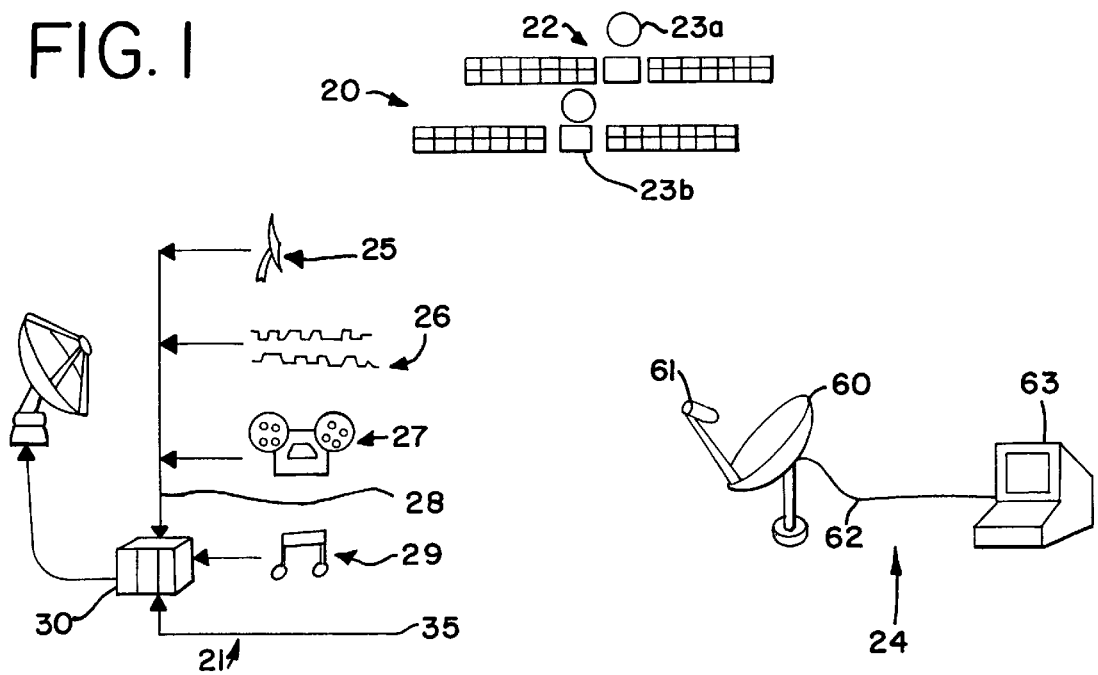
FIG. 1 is a diagram showing a digital satellite system capable of using the present invention.

Referring now to the drawings, FIG. 1 illustrates a digital satellite system 20 capable of utilizing the present invention. The system 20 preferably includes a ground-based uplink facility 21, a space segment 22 including satellites 23a, 23b and a ground-based receiver 24. Although the described embodiment relates to a digital satellite video transmission system, it should be understood that the packet analyzer may be used to monitor terrestrial cable or other multi-program data streams.

Ground-based uplink facility 21 gathers programming information via incoming satellite 25, terrestrial fiber optic paths 26, or pre-recorded programming stored on tape 27. The programming information typically consists of video or audio data. Incoming satellite 25 and fiber optic National Television Standards Committee (NTSC) format television signals 26 are digitized and converted to a 270 Mbps serial digital video data stream 28. Pre-recorded materials 27 are reviewed for quality and transferred to a standard recording format for storage until broadcast time. The standard recording format material is also digitized onto a 270 Mbps serial video stream 28 at broadcast time. Audio material is likewise maintained and transmitted in a suitable digital format 29.

Figure 2:
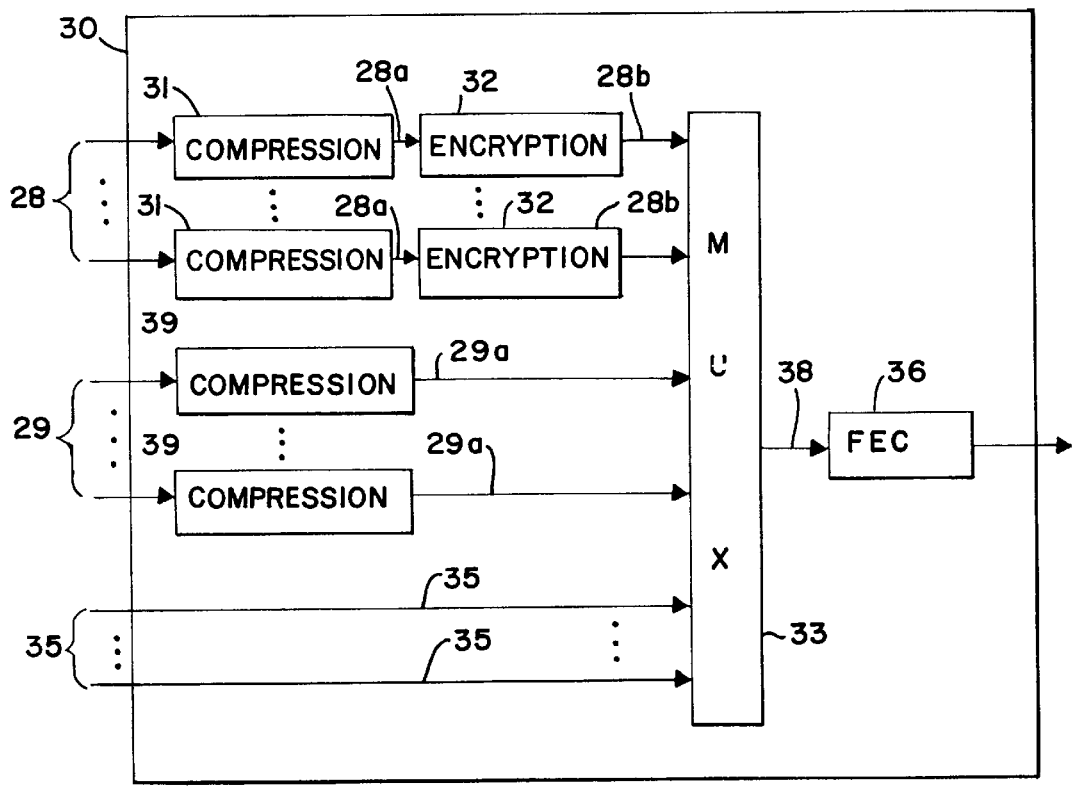
FIG. 2 shows a block diagram of the packet processing of the uplink signal processing system of FIG. 1.

As seen in FIG. 2, the digital video 28 and audio signals 29 are routed to the Uplink Signal Processing System (USPS) 30 for video compression 31, encryption 32, and multiplexing 33 with control data 35. The 270 Mbps digital data streams 28 are compressed 31 into a 3.5–7.5 Mbps digital compressed video data stream 28a using a MPEG-2 type compression scheme. Depending on the video content, the MPEG-2 type compression allows a possible 36:1 to 70:1 data compression. The compressed video signal 28a is encrypted by logic 32 to prevent unauthorized access to the signal. Audio signals are similarly compressed 39 but not ordinarily encrypted, but could be encrypted. The processed video and audio data streams 28b, 29b are packetized and multiplexed along with a number of network control data streams 35 into a single packet stream 38. Control information is preferably not encrypted. Packetizing breaks up the data streams 28a, 29a, 35 into fixed-length blocks or packets. Multiplexing combines packets from the different data streams 28a, 29a, 35 into a multi-program packet data stream 38. The packet stream 38 is provided with forward error correction (FEC) 36 to correct transmission errors at the receiver.

Figure 3:
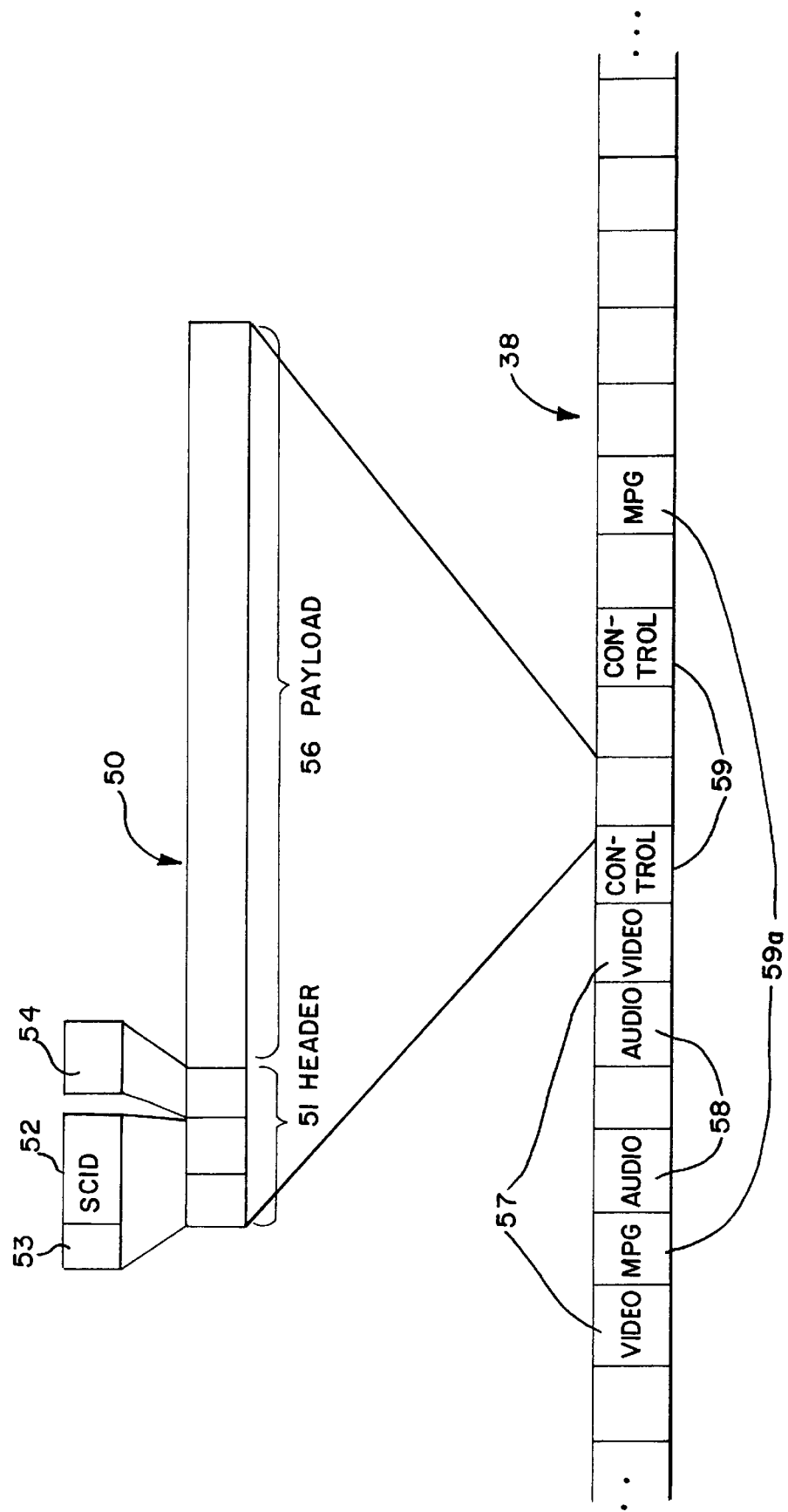
FIG. 3 shows a digital packet and the digital packet stream transmitted by the uplink signal processing system of FIG. 2.

As shown in FIG. 3, the multiplexed packet stream 38 contains data in groups of bytes or packets 50. In a preferred embodiment, each fixed-length packet 50 contains over 100 bytes of eight bits per byte. The first several bytes of a packet 50 preferably comprise a packet header 51. The packet header 51 contains bits 53 identifying the packet type and additional address bits 52 identifying the service being carried by the packet. All packets with the same address or service channel ID form a program or service channel. The packet header 51 may also include information which aids in packet framing, indicates whether or not the packet is encrypted, and identifies the type of service being carried by the packet (video, audio, data or control). The header 51 may also include a continuity counter 54 which increments for successive packets with the same service channel ID.

The remaining bytes of the packet 50 comprise the data or the payload 56. The payload bytes 56 can contain any type of information. Preferably, payload 56 contains user services (video, audio, or data) or system control information. For example, in a typical system, the payload bytes 56 of a basic video service packet contains MPEG-2 compressed digital video data 57. Alternatively, the payload 56 may contain digitally encoded audio data 58 sampled at a 48 KHz rate, or the 44.1 KHz compact digital disc format. The payload 56 can also carry system control information 59. In addition, a number of bytes (not shown) may be added to packet 50 for forward error-correction. To provide greater error correction and a more robust signal, a large number of FEC bytes may be added. The addition of FEC bytes, however, reduces the data rate of the packet stream. Preferably two packet stream data rates are used, 30.3 Mbps or 23.6 Mbps.

With the multiplexed packet scheme, a single 30.3 Mbps multi-program packet stream 38 is capable of carrying up to four television channels or up to eight recorded film channels, several audio channels and system control information. Up to 32 (or more) multi-program packet streams 38 may be provided to deliver over 100 channels of video. Each of the 32 packet streams has a service information or Master Program Guide (MPG) channel which identifies the different video 57, audio 58, and control stream packets 59 present in the packet stream. The MPG 59a lists the available channels by service channel ID and the programming associated with each service channel ID. The MPG 59a may also contain system information such as network configuration data and other system parameters. MPG packets 59a are sent periodically, preferably every second.

Each of the 32 multi-program packet streams 38 are quadrature phase-shift key (QPSK) modulated onto a carrier frequency with a symbol rate of 20 Mega symbols/sec, to provide a total bit rate of 40 Mbps. The 40 Mbps carrier is upconverted in frequency to one of 32 assigned uplink frequencies between 17.3 to 17.8 GHz. The signals are uplinked to a satellite 23.

Figure 4:
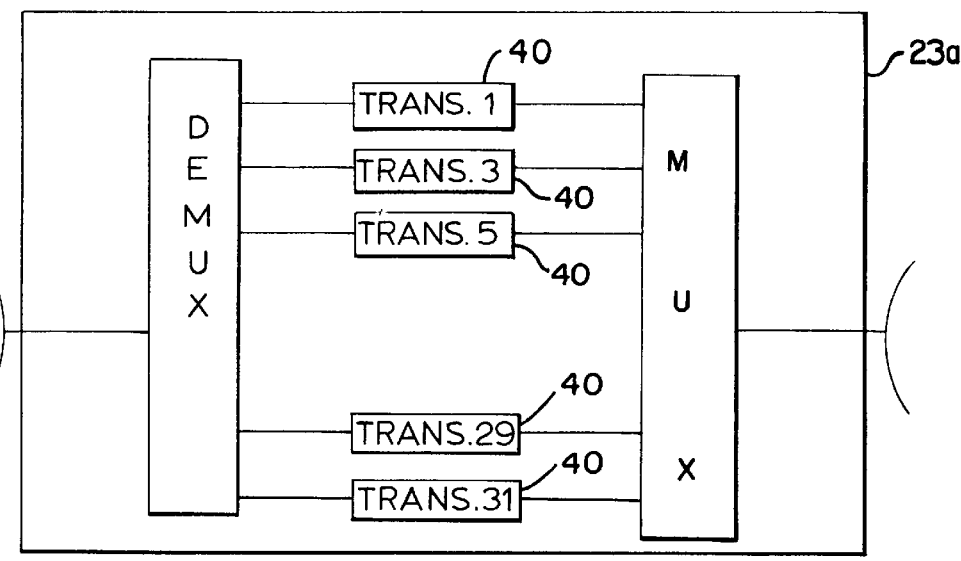
FIG. 4 shows the transponder layout of two satellites which can be used on the system of FIG. 1.
Figure 4:
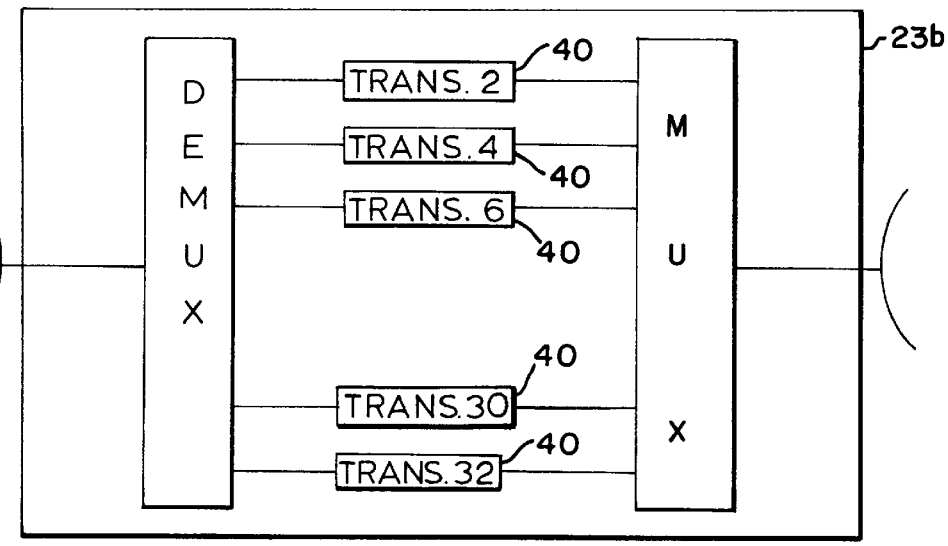

As shown in FIG. 4, the satellites 23a, 23b are ordinarily a geostationary satellite such as a HUGHES® HS-601™ spacecraft. Satellites 23a, 23b are preferably two geostationary satellites located in very close geostationary orbits. Each satellite preferably has 16 high-power (120 watt) transponders 40. Each transponder 40 operates at one of the 32 uplink frequencies between 17.3 to 17.8 to receive one of the 32 uplinked signals. A transponder 40 receives one of the uplinked carrier signals and converts it to one of 32 assigned downlink frequencies between 12.2 to 12.7 GHz.

Referring again to FIG. 1, the downlinked signals are captured at ground-based receiver 24 by antenna 60 and focused to a feed 61. The feed 61 converts the focused signals to an electrical signal which is amplified and down-converted in frequency by a low noise block down converter (LNB) (not shown). The LNB down-converts the signals to 32 carrier frequencies between 950 MHz to 1450 MHz. The amplified and down-converted signals are transmitted via coaxial cable 62 to the packet stream analyzer 63.

Figure 5:
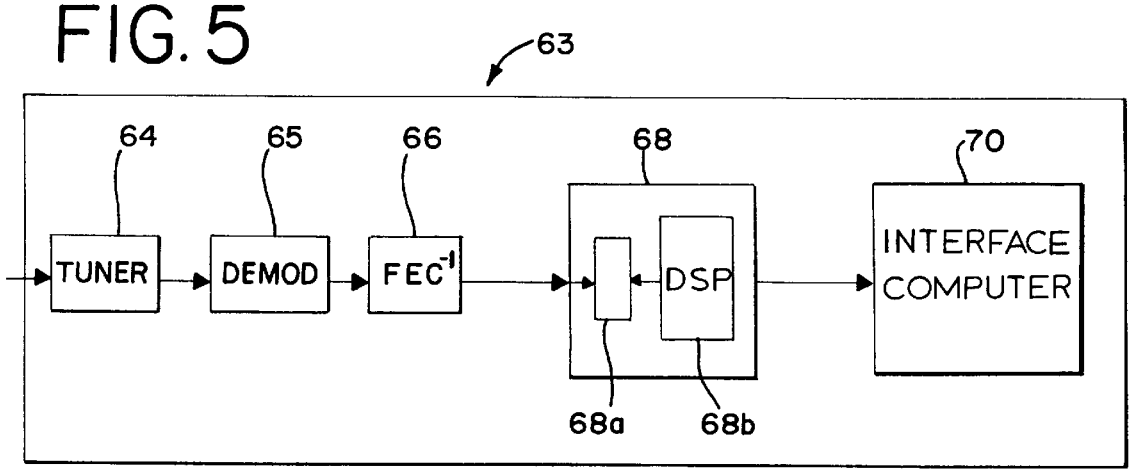
FIG. 5 shows a block diagram of the packet stream analyzer.

As seen in FIG. 5, the packet stream analyzer 63 preferably comprises a tuner 64, a demodulator 65, inverse forward-error-correction logic 66 ($FEC^{-1}$), analyzer logic 68 and an interface computer 70. Tuner 64 tunes to one of the 32 carrier signals within the 950 to 1450 MHz frequency range. Demodulator 65 demodulates a selected carrier into a digital packet stream. Inverse forward error-correction ($FEC^{-1}$) logic 66 using circuitry or software is provided to apply the FEC bits to correct transmission bit errors. The tuning, demodulating, and $FEC^{-1}$ may be performed using conventional techniques, as are well known in the art. After the $FEC^{-1}$ is performed, the originally transmitted packet stream 38 (FIG. 3) is recovered.

Analyzer logic 68 provides circuitry and software to monitor and verify the integrity of the received packet stream 38. The packet stream 38 is also available at uplink facility 21 (FIG. 1). The packet stream can therefore also be analyzed at the uplink. Testing the received packet stream at ground-based receiver 24, however, allows end-to-end monitoring of the operation of the satellite delivery system including the modulators at the uplink transmitter 21, the satellite and the performance of the forward error-correction. Testing the received packet stream also allows testing at a location remote from the uplink facility. Accordingly, it is preferred that the integrity of the packet stream 38 is monitored after it has been transmitted and received.

As shown in FIG. 5, analyzer logic 68 preferably includes an input buffer 68a for storing packets from the packet stream to be monitored. Analyzer logic 68 preferably includes a dedicated digital signal processor 68b to analyze the packet stream in realtime, as packets arrive. At the 30.3 Mbps data rate, about 30,000 packets arrive every second, which translates to a packet arriving every 34 msecs. A dedicated signal processor such as a Texas Instruments TMS320C30 running at 20 MHz, for example, can be programmed according to the desired functions to process packets within the 34 msecs window. One skilled in the art will recognize that other logic or signal processors or other equivalent forms of logic such as a field programmable gate array (FPGA) or application specific integrated circuit (ASIC) may be used to implement the analyzer logic 68.

The interface computer 70 displays the monitoring and verification results. The interface computer 70 may run high-level user interface software and act as a host machine for the analyzer logic 68. The interface computer 70 may be any device capable of accepting input and displaying results to a user. For example, a general purpose computer such as any IBM compatible personal computer, an Apple computer, or more powerful workstation computer may be used. In addition, a dedicated packet stream analyzer with integrated tuning, demodulating, $FEC^{-1}$, analyzer logic and user display hardware may also be constructed by combining the tuner 64, demodulator 65, $FEC^{-1}$, analyzer logic 68 and interface computer 70 into a single unit. The integrated unit is preferably ruggedized to enable transportable operation.

Analyzer logic 68 preferably performs four types of functions on the packet stream: monitoring, verification, debug and statistics keeping.

The monitor function looks at the flow of packets and displays the service channel IDs and channels available in the packet stream 38. For example, the monitor function preferably reads the packet header 51 of each packet to identify the packet's service channel ID. MPG packets 59a containing information about the various channels in the multi-program packet stream preferably have a service channel ID number of 1. The MPG 59a preferably lists the service channel IDs in the packet stream, the channel number of each service channel ID, and the programming carried by each service channel ID. The monitor function identifies each service channel ID, the associated channel number, and the available programming. For example, packets with service channel ID number 10 may be program channel 200 which carries ESPN. Packets with service channel ID number 20 may be channel 201 which carries C-SPAN. The monitor function may display the MPG information on the interface computer 70 to serve as an electronic program guide to the packets and channels present in the packet stream.

In addition to the above channel parameters, the MPG 59a may also contain overall network parameters such as daylight savings time changeovers, rating system information, etc. The monitor function may also display this type of information.

The verify function tests the packet headers 51 and MPG packets 59a to confirm the integrity of the packet stream 38. For example, the verify function tests the semantics and sequencing of the packet stream. Each packet header 51 may contain information regarding the content and sequencing of packets. The packet stream analyzer verifies the packet header 51 information against the contents of the packets. Any errors or violations are detected, flagged and displayed on the interface computer 70.

The debug function allows a user to store particular packets. The statistics function maintains statistics to track the status of the packet streams. Preferably, analyzer logic 68 performs the monitor, verify, debug and statistics functions simultaneously.

The four basic functions of analyzer logic 68, monitor, verify, debug, and statistics, are preferably utilized in one of two modes, dwell mode (single transponder monitoring) or scan mode (multiple transponder monitoring).

Figure 6:
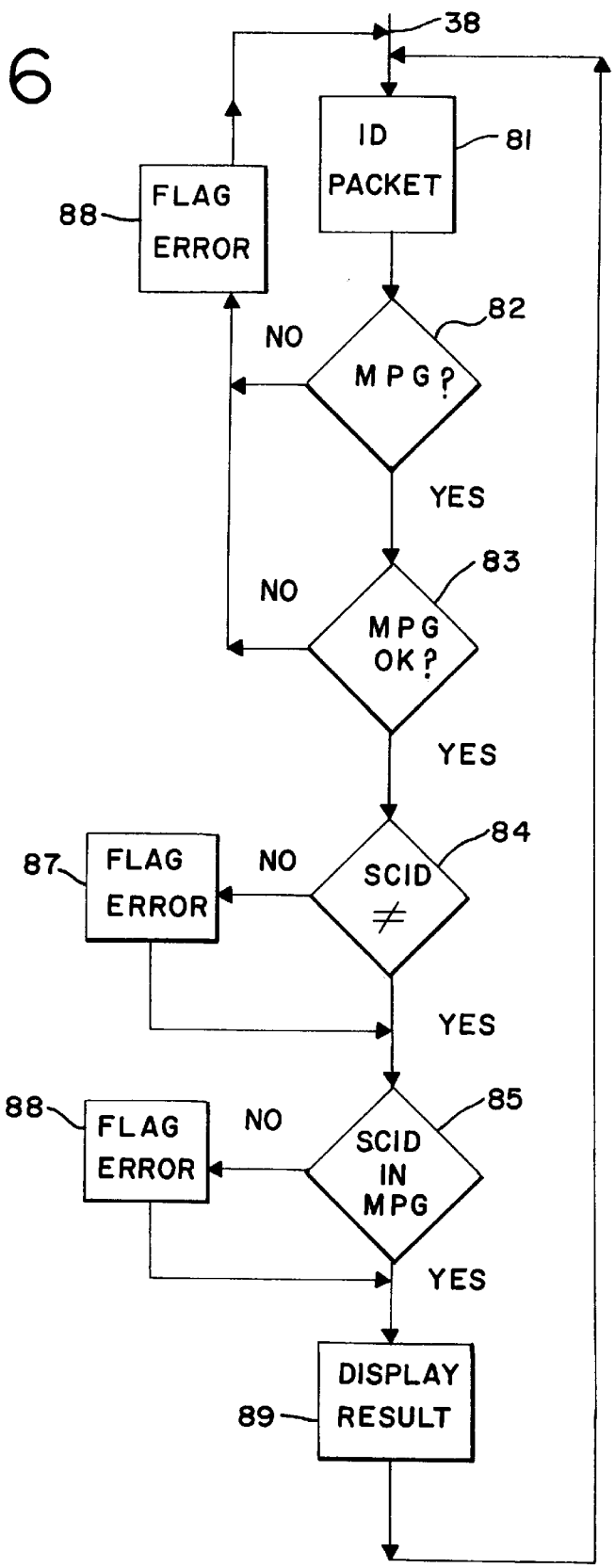
FIG. 6 shows a flow diagram for a monitor and verify function of the device of FIG. 5.

As shown in FIG. 6, the dwell mode, analyzes a single packet stream 38 broadcast from a single satellite transponder 40. For example, the dwell mode monitors the packet stream 38 by reading packet headers 51 (FIG. 3) and identifying 81 each packet. MPG packets are verified 82 as being present in the packet stream. In other words, the channels identified in the MPG are verified as being present in the datastream. The MPG syntax and information is also verified 83 as correct. In addition, the packet stream is verified according to information in the MPG. For example, the packet stream is checked to verify 84 that no two successive packets have the same service channel ID number, and that all service channel IDs present in the packet stream are listed 85 in the MPG. Detected errors may be identified and recorded.

The dwell mode also preferably monitors the data rate of each channel. The data rate of the overall packet stream is preferably either 30.3 Mbps or 23.6 Mbps. The data rate of any particular channel is calculated from the number of packets with that particular service channel ID that are present in the data stream. For example, if one-half of the packets in a 30.3 Mbps packet stream have the same service channel ID, the data rate of the channel is 30.3 Mbps/2 or 15.15 Mbps. If one-tenth of the packets in a 30.3 Mbps packet stream have the same service channel ID, the data rate of the channel is 30.3 Mbps/10 or 3.03 Mbps. The dwell mode statistics function maintains and displays the data rate for each service channel ID.

The debug function allows the recording and storing of selected packets in memory. Preferably, the debug function also allows the user to program and select the types of faults the user wishes to capture and store, similar to software debug utilities well known to those skilled in the art. The user may view the stored packets at a later time to review and identify faults.

One skilled in the art will recognize that any of the verification tests may be omitted. Of course, other tests on the packet stream are possible. For example, the analyzer logic can be programmed to verify that the continuity counter 54 of successive packets with the same service channel ID 52 are sequentially numbered. In addition, all service channel IDs listed by the MPG can be verified as being found in the packet stream. It should be understood that those skilled in the art can program the analyzer logic 68 to omit or add verification functions as desired.

The interface computer displays 89 all the service channel IDs found in the packet stream along with each service ID number (SCID), name and type of each channel (video, audio, etc) and its data rate. The list is preferably displayed electronically on the display monitor of the interface computer 70 (FIG. 5) and continuously updated. Table 1 shows a typical display.

TABLE 1

TRANSPONDER 04 SERVICE CHANNEL IDs FOUND:

| SCID | CHANNEL | NAME | RATE |
| --- | --- | --- | --- |
| 00 | — | NULL | 0.03 |
| 01 | — | MPG | 0.10 |
| 10 | 200-v | ESPN | 7.80 |
| 11 | 200-a1 | ESPN | 0.12 |
| 12 | 200-a2 | ESPN | 0.13 |
| 20 | 201-v | C-SPAN | 3.50 |
| 21 | 201-a1 | C-SPAN | 0.25 |

SCIDs PRESENT: 00, 01, 10, 11, 12, 20, 21, 30, 31
ABSENT SCIDs: --none--
UNEXPECTED SCIDS: --none--
ERRORS: --none--

As seen in Table 1, the transponder number (04) of the monitored packet stream is identified at the top of the display. Below the transponder number, a table listing each SCID and information about the SCID is displayed. Such information may include the channel number, name and channel data rate. For example, SCID 10 in Table 1 is channel 200-v carrying ESPN at a data rate of 7.80 Mbps. The "v" designates that SCID 10 is a video channel. SCIDs 11 and 12 are two audio channels, 200-a1 and 200-a2, associated with channel 200-v. Because the number of SCIDs on the transponder may exceed what can be displayed on one screen, the list of SCIDs may be scrolled up or down.

Below the SCID table in Table 1, SCIDs PRESENT displays a list of all SCIDs in the packet stream. ABSENT SCIDs lists SCIDs which are identified by the MPG but not found in the packet stream. UNEXPECTED SCIDs lists the SCIDs found in the packet stream which are not listed in the MPG. Ordinarily, ABSENT SCIDs and UNEXPECTED SCIDs are not present. Any errors found by verification tests can also be listed under ERRORS.

The scan mode allows the automatic cycling of the monitor and verification functions among various satellite transponders 40. The scan mode loops through all or a number of satellite transponders 40 (FIG. 4) to monitor and verify the packet stream of each transponder 40. The scan mode tunes to a transponder 40 and performs the monitoring, verifying, statistics and debug functions. The monitor, verify, debug, and statistics functions performed by the scan mode are similar to the functions performed by the dwell mode (FIG. 6). After the functions are performed on one transponder, another transponder is tuned and the functions are performed on the next transponder. The scan mode thus allows sequential monitoring of all satellite transponders 40.

The present invention enables an operator to monitor a digital multi-program data stream. The status of the multiplexed digital signals may be viewed and errors identified to the operator. Each packet stream is verified and any errors are reported. The data rate of each SCID channel is maintained and displayed. The troubleshooting of faults is aided by the identification of failing channels by SCID number. The equipment associated with a failing SCID can thus be identified and repaired.

Accordingly, the packet stream analyzer monitors and verifies the proper packetizing and multiplexing of the packet stream.

Of course, it should be understood that a wide range of changes and modifications can be made to the preferred embodiment described above. Other alternate embodiments of the invention may utilize different tuning, demodulating, or $FEC^{-1}$ functions. Other verification tests and display modes are also within the scope of the invention described herein. It is therefore intended that the foregoing detailed description be regarded as illustrative rather than limiting and that it be understood that it is the following claims, including all equivalents, which are intended to define the scope of this invention.

We claim:

1. A method for monitoring a multiplexed data stream comprising a plurality of packets, the packets including a packet header and a payload, at least one of the packets in the data stream comprising a program guide packet carrying at least a portion of a program guide identifying channels carried by the data stream, the method comprising the steps of:

reading the packet headers from the data stream;
reading the program guide packet from the data stream; and, verifying the integrity of the data stream by comparing at least a portion of the program guide carried by the program guide packet with at least two of the packet headers in the data stream to verify at least one of: (a) that at least two of the channels identified in the program guide is present in the data stream, and (b) that at least two of the channels carried by the data stream is identified in the program guide.

2. The method of claim 1 further comprising the step of verifying that each packet header includes an identifier number.

3. The method of claim 2 further comprising the step of verifying that no two consecutive packet headers have the same identifier number.

4. The method of claim 2 further comprising the step of verifying that successive packet headers with the same identifier number have a counter which is sequentially numbered.

5. The method of claim 1 further comprising the step of verifying a data rate for at least one channel of the data stream.

6. The method of claim 5 further comprising the step of maintaining statistics of the data rate for the at least one channel of said data stream.

7. The method of claim 1 further comprising the step of displaying results of integrity verification to a display terminal.

8. The method of claim 1 further comprising the step of maintaining statistics of results of the integrity verification.

9. The method of claim 1 wherein said data stream is broadcast via an orbiting earth satellite.

10. The method of claim 1 wherein said data stream is transmitted via a terrestrial network.

11. The method of claim 1 wherein said data stream is transmitted via a terrestrial cable network.

12. The method of claim 1 wherein the step of verifying the integrity of the data stream is performed to verify that program guide is present in the data stream.

13. The method of claim 1 wherein the step of verifying the integrity of the data stream is performed to verify that every channel identified in the packet headers is identified in the program guide.

14. The method of claim 1 wherein the program guide packet comprises a plurality of packets.

15. A device for analyzing a data stream comprising a plurality of packets, the packets including a packet header and a payload, at least one of the packets in the data stream comprising a program guide packet carrying at least a portion of a program guide identifying channels carried by the data stream, the device comprising:

analyzer logic for analyzing the integrity of said data stream by comparing at least a portion of the with at least two of the packet headers in the data stream to verify at least one of: (a) that at least two of the channels identified in the program guide is present in the data stream, and (b) that at least two of the channels carried by the data stream is identified in the program guide; and, an interface display for displaying results generated by said analyzer logic.

16. The device of claim 15 wherein said analyzer logic compares the at least a portion of the program guide with the at least two of the packet headers to verify that every channel identified in the program guide is present in the data stream.

17. The device of claim 15 wherein said analyzer logic verifies a data rate for at least one channel of said data stream.

18. The device of claim 15 wherein said analyzer logic comprises a logic processor.

19. The device of claim 15 wherein said analyzer logic comprises a digital signal processor.

20. The device of claim 15 wherein said analyzer logic comprises a field programmable gate array.

21. The device of claim 15 wherein said analyzer logic comprises an application specific integrated circuit.

22. The device of claim 15 wherein the logic analyzer compares the at least a portion of the program guide with the at least two of the packet headers to verify that every channel identified in the packet headers is identified in the program guide.

* * * * *